United States Patent Office 3,449,279
Patented June 10, 1969

3,449,279
FIRE RESISTANT COMPOSITIONS COMPRISING AN ELASTOMER AND A FATTY ESTER-HALOGENATED CYCLOPENTADIENE ADDUCT
Raymond R. Hindersinn, Lewiston, and Charles S. Ilardo, Tonawanda, N.Y., assignors to Hooker Chemical Corporation, Niagara Falls, N.Y., a corporation of New York
No Drawing. Filed Sept. 20, 1965, Ser. No. 488,728
Int. Cl. C08f 11/02; C08d 9/10
U.S. Cl. 260—23.7                                20 Claims

ABSTRACT OF THE DISCLOSURE

This invention relates to a fire retardant elastomeric composition comprising (a) an elastomeric material and (b) the Diels-Alder adduct of a fatty ester and a polyhalogenated cyclopentadiene material, said fatty ester being the reaction product of a polyhydric alcohol and a fatty acid, which fatty acid comprises more than 65 percent by weight of linoleic acid and said polyhalogenated cyclopentadiene material having the formula

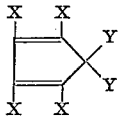

wherein X is selected from the group consisting of fluorine, chlorine and bromine and Y is selected from the group consisting of fluorine, chlorine, bromine and an alkoxy radical of 1 to 10 carbon atoms, said Diels-Alder adduct containing about 10 to 50 weight percent halogen.

---

This invention relates to fire retardant additives for elastomers and more particularly to a hexachlorocyclopentadiene adduct which when incorporated into elastomeric compositions, renders the elastomer fire retardant while in many instances, enhancing the physical properties of the elastomeric composition.

Elastomeric materials of both the thermoset and the thermoplastic type find wide applications in numerous end uses. For many of these uses, the normally flammable elastomers and plasticizers used therein readily support combustion. Therefore, a method of imparting fire resistance to these materials is very desirable.

Attempts have been made to render such compositions fire retardant by the addition of various additives. Many of the previously known additives have had deficiencies which make the elastomeric material unsuited for its end use or which provides an elastomeric composition of inferior physical properties. Another most common deficiency of previous additives have been their tendency to exude from the elastomeric material on aging. Almost all previously known additives have the further deficiency of decreasing the tensile strength and other physical properties of the elastomeric composition. In addition, the fire retardancy has in many instances been less than that desired.

It is an object of the present invention to provide a fire retardant additive which provides the desired fire retardancy while maintaining the physical properties of the elastomeric material. Another object of the present invention is to provide a fire retardant additive particularly useful in butyl rubber, styrene butadiene rubber, ethylene propylene copolymers, ethylene propylene terpolymers and the like elastomers. A further object of the present invention is to provide a fire retardant additive which when incorporated into elastomeric materials, provides permanent fire retardancy without exuding on aging. These and other objects will become apparent to those skilled in the art from the description of the invention which follows.

In accordance with this invention there is provided a fire retardant elastomeric composition comprising (a) an elastomeric material and (b) the Diels-Alder adduct of a fatty ester and a polyhalogenated cyclopentadiene compound, said fatty ester being the reaction product of a polyhydric alcohol and a fatty acid comprising more than 65 percent by weight of linoleic acid and said polyhalogenated cyclopentadiene compound having the formula:

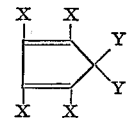

wherein X is selected from the group consisting of fluorine, chlorine, bromine and an alkoxy radical of 1 to 10 carbon atoms, said Diels-Alder adduct containing at least about 10 to 50 weight percent of halogen. The preferred fatty ester is safflower oil and the preferred fire retardant composition further includes a compound selected from the group consisting of antimony compounds, bismuth compounds or arsenic compounds.

The Diels-Alder adduct of the present invention provides a method of incorporating fire retardancy into elastomeric materials without detrimental effect to the physical characteristics of the material. In addition to retaining or enhancing the physical properties of the elastomeric composition, the adducts of the present invention are permanently incorporated into the elastomeric composition thereby eliminating the previous difficulties with the fire retardants exuding, sweating or blooming from the end composition even after extended heat aging.

The elastomeric materials to which the adducts are added are normally addition polymers of both the thermoset and thermoplastic type. Typical elastomeric materials include acrylics, e.g., acrylic rubber, acrylonitrile-butadiene styrene rubbers, butadiene-acrylonitrile copolymers; butyl rubber; chlorinated rubbers, e.g., polyvinyl chloride resins, chloroprene rubber, chlorosulfonated polyethylene; ethylene polymers, e.g., ethylene-propylene copolymers, ethylene-propylene terpolymers; fluorinated rubbers; butadiene rubbers, e.g., styrene-butadiene rubber, isobutylene polymers, polybutadiene polymers, polyisobutylene rubbers; polyisoprene rubbers, polysulfide rubbers, silicone rubbers, urethane rubbers, high styrene resin latices, high styrene resins, vinyl resins, and the like.

The polyhalogenated cyclopentadienes suitable for use in this invention include hexachlorocyclopentadiene, 5,5-dimethoxytetrachlorocyclopentadiene, hexabromocyclopentadiene, 5,5-dibromotetrachlorocyclopentadiene, 5,5-difluorotetrachlorocyclopentadiene, 5,5-diethoxytetrachlorocyclopentadiene, and the like. Of these, hexachlorocyclopentadiene is preferred.

The fatty ester adducted to the polyhalogenated cyclopentadiene is preferably a glycerol ester of a fatty acid wherein the fatty acid is of a composition comprising more than 65 percent by weight of linoleic acid. The remaining percentages of fatty acid can be any saturated or ethylenically unsaturated fatty acid having 12 to 22 carbon atoms and more preferably oleic and linolenic acid. In addition to the preferred glycerol ester, other polyhydric alcohols can be reacted with the described fatty acids to produce low acid number esters of polyols having two or more hydroxyl groups. Typical polyols include ethylene glycol, diethylene glycol, pentaerythritol, dipentaerythritol, sorbitol, and the like polyhydric alcohols.

The fatty esters are made by known methods by reacting an equivalent weight of fatty acid with an equivalent weight of polyhydric alcohol or as in the preferred ester, the natural vegetable oil can be used.

The Diels-Alder adduct of the fatty ester is made by reacting the polyhalogenated cyclopentadiene with the fatty ester so as to provide an adduct containing 10 to 50 percent by weight of halogen. An adduct containing the preferred amount of halogen is produced by reacting a described ester with a polyhalogenated cyclopentadiene in a proportion of about 0.1 to 1.1 equivalent polyhalogenated cyclopentadiene per equivalent of ester. Preferably, the ratio of polyhalogenated cyclopentadiene to oil equivalents is in the range of about 0.5 to about 1 polyhalogenated cyclopentadiene equivalent per 1 equivalent of ester. The equivalent weight of the oil is based upon the calculated ethylenic unsaturation in the oil as determined by the iodine value. For safflower oil, which is about 77 to 78 percent linoleic and which has an iodine value of about 145, this corresponds to an average of 5 ethylenic carbon-carbon positions of unsaturation. Theoretically, the polyhalogenated cyclopentadiene can be substituted in each of the double bond positions thus making it possible to substitute up to about 5 polyhalogenated cyclopentadiene molecules per molecule of safflower oil.

The adduct may be prepared by mixing the polyhalogenated cyclopentadiene and the fatty ester in a reaction vessel and heating to a temperature of about 150 degrees centigrade to 250 degrees centigrade until the desired amount of adduction has occurred. The most preferred adduct is obtained when an average of about 4.5 moles of hexachlorocyclopentadiene is adducted to 1 mole of safflower oil.

The resulting adducts are soluble in many common organic solvents including hydrocarbon solvents such as hexane, mineral spirits and the like, halogenated hydrocarbons such as trichloroethylene, aromatics such as benzene, xylene, chlorinated benzenes and the like, and various other organics such as methyl ethyl ketone, styrene, normal butylacetate, and the like. Therefore, if desired, the resulting adduct can be thinned with solvents during processing.

The halogenated Diels-Alder adducts of the present invention are desirably incorporated into the elastomeric materials in an effective fire retardant amount. Generally, the halogenated adduct is added in an amount of about 2 to about 50 percent by weight of the elastomeric material and more preferably in an amount of about 5 to 40 percent by weight.

It is also preferred to add a compound selected from the group consisting of compounds of arsenic, antimony or bismuth to the elastomeric composition to increase the fire retardancy. The arsenic, antimony and bismuth compounds are incorporated into the elastomeric material in an amount of about 2 to 30 percent by weight of the elastomeric material and more preferably in an amount of about 5 to 20 percent by weight of said elastomeric material.

The arsenic, antimony and bismuth compounds added are normally the respective oxides and sulfides, but other compounds of these elements can be used wherein the arsenic, antimony or bismuth is provided. The various other arsenic, antimony and bismuth compounds suitable for this addition are described in the literature. These suitable compounds, particularly antimony compounds, include the sulfides of antimony, antimony salts of organic acids and their pentavalent derivatives and the esters of antimonous acids and their pentavalent derivatives. Sodium antimonite or potassium antimonite are conveniently used when it is desirable to use an alkali metal salt of the antimony as the added reagent. Other suitable antimony compounds include the organic salts of organic acids and their pentavalent derivatives including antimony butyrate, antimony valerate, antimony caproate, antimony heptylate, antimony caprylate, antimony pelargonate, antimony caprate, antimony cinnamate, antimony anisate and their tri- and pentavalent derivatives. Likewise, the esters of antimonous acids and their pentavalent derivatives such as tris(n-octyl)antimonite, tris(2-ethylhexyl)antimonite, tribenzyl antimonite, tris($\beta$-chloroethyl)antimonite, tris($\beta$-chloropropyl)antimonite, tris($\beta$-chlorobutyl)antimonite, tris($\beta$-chlorobutyl) antimonite and their pentavalent dihalide derivatives. Still other suitable organic antimony compounds are the acyclic antimonites such as trimethylol cyclopropane antimonite, pentaerythritol antimonite and glycerol antimonite. Equally satisfactory results are obtained with the oxides of sulfides of bismuth and arsenic as well as lead salts of arsenic acids.

The following examples illustrate certain preferred embodiments of the present invention. Unless otherwise indicated all parts and percentages used herein are by weight and all temperatures in the examples and claims are in degrees centigrade, unless otherwise indicated.

EXAMPLE 1

A safflower oil adduct of hexachlorocyclopentadiene was prepared by placing 246 parts of hexachlorcyclopentadiene and 125 parts of safflower oil in a reaction vessel equipped with a stirrer, condenser, thermometer and heating means. A nitrogen gas flow was passed across the surface of reactants in the reaction vessel. The charge was then slowly brought to a temperature of 180 degrees centigrade under the nitrogen atmosphere, and maintained at that temperature for 24 hours. The product was then vacuum stripped at 180 degrees centigrade at a vacuum of about one millimeter of mercury.

The resulting product was a dark brown semi-solid at room temperature having a chlorine content of 44 to 45 percent chlorine, a density at 24 degrees centigrade of 1.35 grams per cubic centimeter and a Brookfield viscosity of 12.5 poises at 100 degrees centigrade.

EXAMPLES 2 THROUGH 4

The fire retardant properties and the physical characteristics of the safflower oil adduct prepared in Example 1 was tested when incorporated into a styrene-butadiene rubber composition and compared to a chloroparaffin containing 70 percent chlorine compounded with styrene-butadiene rubber and other fire retardant materials.

The styrene-butadiene rubber was compounds as shown in Table I.

TABLE I

| | Example | | |
|---|---|---|---|
| | 2 | 3 | 4 |
| Styrene-butadiene rubber (Ameripol 1500) | 100 | 100 | 100 |
| Safflower oil adduct of Example 1 | 30 | | |
| Chloroparaffin (70 percent chlorine) | | 30 | |
| Antimony trioxide | 6 | 6 | |
| Carbon black | 40 | 40 | 40 |
| Stearic acid | 2 | 2 | 2 |
| Zinc oxide | 3 | 3 | 3 |
| Sulfur | 2 | 2 | 2 |
| Curing agent (n-cyclohexylbenzylthiazole-2-sulfamide) | 1.2 | 1.2 | 1 |
| Aromatic oil | | 10 | 10 |

The above compositions were prepared by milling on a two roller rubber mill having rollers heated to a temperature of about 60 degrees centigrade. The styrene-butadiene rubber was first milled for one to two minutes followed by the gradual addition of the carbon black mixed with the extending oils, flame retardant additives, stearic acid and zinc oxides. Milling was continued until the dispersion of the compounding ingredients appeared to be complete. The combination of accelerators and curing agents were added last and thoroughly milled for about two minutes. The total milling time was 20 minutes. It was found to be preferred to heat the safflower oil adduct to a temperature of about 100 degrees centigrade to 120 degrees centigrade prior to mixing with the rubber composition and more preferably to mix the carbon black with the adduct prior to incorporating it into the rubber compound.

After milling, 25 to 30 gram portions of the milled sheets were placed in a sheet mold (4 x 4 x 0.070 inches) and clamped at 10,000 pounds per square inch pressure. The composition was cured for 40 minutes at a temperature of 140 degrees centigrade. The cured rubber was removed hot.

Tensile specimens were then stamped from the press cures after cooling using a die to provide 1/8 x 2 1/4 x 0.070 inch tensile specimens. Tensile and elongation breaks were determined in triplicate for each composition using a Scott Tensile Tester.

Triplicate specimens of 1/2 x 4 x 0.070 inches were also cut from the cured sheets and tested for flammability. The ASTM D-635-56T test procedure was used in the test with the exception that the test strips were 80 to 110 mills in thickness instead of the specified 125 mills thickness. The flame-out time, distance burned and afterglow were determined for each specimen after a 30 second ignition with a one inch Bunsen burner flame.

Triplicate tensile specimens for each mix were weighed and heat aged in a forced draft oven for seven days at 70 degrees centigrade and then reweighed and tested for the retention of tensile strength and elongation.

Table II shows the results obtained.

TABLE II

|  | Example | | |
|---|---|---|---|
|  | 2 | 3 | 4 |
| ASTM D-635-56T flame test (Self-extinguishing time, seconds) | 9 | 2 | (¹) |
| Hardness, Shore A-2 | 63 | 62 | 63 |
| Tensile strength, ultimate pounds per square inch | 3,100 | 2,330 | 2,800 |
| Elongation at break, percent | 730 | 860 | 720 |
| Heat Aging—Weight loss, percent | −1.1 | (²) | −2.6 |
| Tensile, percent retention | 88 | (²) | 93 |
| Elongation, percent retention | 67 | (²) | 38 |

¹ 60 and burning.  ² Not tested.

As will readily be seen in examining Table II, the addition of the safflower oil adduct increased the tensile strength, while retaining the other physical characteristics of the styrene-butadiene rubber as shown in the control which is Example 4. Also, as is normally expected by the addition of fire retardant compositions, Example 3 which uses a chlorinated paraffin, a substantial drop in the tensile strength results by this addition. The stability of the added safflower oil adduct is further shown on the heat aging test wherein the weight loss was very low, the tensile retention was about the same as the control and wherein the elongation retention was markedly improved over that of the control.

EXAMPLE 5

This example illustrates the use of the safflower oil adduct of Example 1 used as a fire retardant compounded with butyl rubber. Table III shows the composition of the control and that of Example 5.

TABLE III

|  | Control | Example 5 |
|---|---|---|
| Butyl rubber (Enjay 218) | 100 | 100 |
| Carbon black | 50 | 50 |
| Adduct of Example 1 | 0 | 40 |
| Naphthenic oil | 20 | 0 |
| Antimony trioxide | 0 | 20 |
| Zinc oxide | 5 | 5 |
| Stearic acid | 2 | 2 |
| Sulfur | 1.3 | 2.5 |
| Tetramethyl thiuram disulfide | 1.5 | 3.0 |
| Mercaptobenzothiazole | 1.0 | 2.0 |

The composition of this example was milled in the same manner as that of Examples 2 through 4 for a total milling time for 30 minutes. The composition was then molded in the same manner as Examples 2 through 4 but cured at 160 degrees centigrade for a total cure time of 30 minute.

Test strips were cut and the various tests were conducted with the cured butyl rubber composition in the same manner as in Examples 2 through 4. Table IV shows the results obtained.

TABLE IV

|  | Control | Example 5 |
|---|---|---|
| Hardness, Shore A-2 | 68 | 76 |
| ASTM D-635-56T: | | |
| Self-extinguishing time, seconds | (¹) | 9 |
| Distance burned, inches |  | 0.16 |
| Afterglow, minutes |  | >3 |
| Heat Aging—120 degrees centigrade for one week: Weight loss, percent | −5.2 | −2.4 |

¹ Burning.

EXAMPLE 6

This example illustrates the addition of the adducts of the present invention to ethylene-propylene terpolymers to produce fire retardant compositions. The control and composition of the present invention were formulated as shown in Table V.

TABLE V

|  | Control | Example 6 |
|---|---|---|
| Ethylene-propylene terpolymer (Enjay 3509) | 100 | 100 |
| Carbon black | 150 | 150 |
| Adduct of Example 1 | 0 | 30 |
| Naphthenic oil | 40 | 20 |
| Antimony trioxide | 0 | 15 |
| Zinc oxide | 5 | 5 |
| Stearic acid | 1 | 1 |
| Tetramethyl thiuram disulfide | 1.5 | 1.5 |
| Mercaptobenzothiazole | 0.5 | 0.5 |
| Sulfur | 1.5 | 1.5 |

The above compositions were milled at a temperature of 110 degrees centigrade for a total milling time of 40 minutes. With the exception of the time and temperature of milling, the compounding was carried out in the same manner as that described in Examples 2 through 4. The milled composition was then molded and cured at 160 degrees centigrade for a total curing time of 30 minutes. From the cured material, burning test strips were cut as described in Examples 2 through 4. Table VI shows the test results obtained.

TABLE VI

|  | Control | Example 6 |
|---|---|---|
| Hardness, Shore A-2 | 85 | 87 |
| ASTM D-635-56T: | | |
| Self-extinguishing time, seconds | (¹) | 27 |
| Distance burned, inches |  | 0 |
| Afterglow, minutes |  | >3 |
| Heat Aging—120 degrees centigrade for one week: Weight loss, percent | −6.1 | −3.7 |

EXAMPLE 7

This example illustrates the results obtained when the adduct of the invention is incorporated into an ethylene-propylene rubber composition. This rubber was compounded using a control and the adduct of Example 1 as shown in Table VII.

TABLE VII

|  | Control | Example 7 |
|---|---|---|
| Ethylene-propylene rubber (Enjay 404) | 100 | 100 |
| Carbon black | 110 | 135 |
| Adduct of Example 1 | 0 | 30 |
| Naphthenic oil | 10 | 0 |
| Antimony trioxide | 0 | 6 |
| Zinc oxide | 5 | 5 |
| Dicumylperoxide | 2.7 | 2.7 |
| Sulfur | 0.32 | 0.32 |

The above compositions were milled in the manner of Examples 2 through 4 at a milling temperature of 110 degrees centigrade for a total milling time of 30 minutes. The milled composition was then cured at a temperature of 100 degrees centigrade for 40 minutes.

Again, burning strips were cut from the cured rubber in the manner of Examples 2 through 4 and tested as previously described. The results obtained are shown in Table VIII.

TABLE VIII

| | Control | Example 7 |
|---|---|---|
| Hardnes, Shore A-2 | 78 | 84 |
| ASTM D-635-56T: | | |
| Self-extinguishing time, seconds | (1) | 10 |
| Distance burned, inches | | 0 |
| Afterglow, minutes | | >3 |
| Heat Aging—120 degrees centigrade for one week: Weight loss, percent | −4.6 | −1.5 |

[1] Burning.

EXAMPLES 8 AND 9

A styrene-butadiene composition was prepared using the adduct of Example 1 and antimony sulfide and lead arsenate as further fire retardant additives. Table IX shows the compositions used.

TABLE IX

| | Example 8 | Example 9 |
|---|---|---|
| Styrene-butadiene rubber (Ameripol 1500) | 100 | 100 |
| Safflower oil adduct | 30 | 30 |
| Carbon black | 40 | 40 |
| Antimony trisulfide $Sb_2S_3$ (65 percent) | 0 | 15 |
| Lead arsenate $PbHAsO_4$ (technical) | 15 | 0 |
| Zinc oxide | 3 | 3 |
| Stearic acid | 2 | 2 |
| Sulfur | 4 | 4 |
| Curing agent (n-cyclohexylbenzylthiazole-2-sulfamide) | 2.4 | 2.4 |

The described compositions were milled and cured in the same manner as Examples 2 through 4. Table X shows the results of the ASTM D-635-56T flame test run as described in Examples 2 through 4.

TABLE X

| | Example 8 | Example 9 |
|---|---|---|
| Self-extinguishing time, seconds | 7.4 | 33 |
| Distance burned, inches | 0.2 | 0.7 |
| Afterglow, minutes | >3 | >3 |

In a like manner, other elastomeric materials are compounded with the fatty ester adducts described herein to produce fire retardant compositions of the present invention. Such compositions can eliminate carbon black and various other extenders. In place of the antimony trioxide used, other antimony, arsenic and bismuth compounds are used in the same manner to produce correspondingly good results.

While there have been described various embodiments of the present invention, the methods described are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A fire retardant elastomeric composition comprising (a) an elastomeric material and (b) the Diels-Alder adduct of a fatty ester and a polyhalogenated cyclopentadiene material, said fatty ester being the reaction product of a polyhydric alcohol and a fatty acid, which fatty acid comprises more than 65 percent by weight of linoleic acid and said polyhalogenated cyclopentadiene material having the formula:

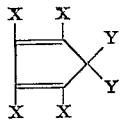

wherein X is selected from the group consisting of fluorine, chlorine and bromine and Y is selected from the group consisting of fluorine, chlorine, bromine and an alkoxy radical of 1 to 10 carbon atoms, said Diels-Alder adduct containing about 10 to 50 weight percent halogen.

2. The fire retardant elastomeric composition of claim 1 wherein the fatty ester is safflower oil.

3. The fire retardant elastomeric composition of claim 1 wherein the polyhalogenated cyclopentadiene is hexachlorocyclopentadiene.

4. The fire retardant elastomeric composition of claim 1 wherein the composition contains 2 to about 30 percent by weight of the elastomeric material, of a compound selected from the group consisting of arsenic compounds, antimony compounds and bismuth compounds.

5. The fire retardant elastomeric composition of claim 1 wherein the Diels-Alder adduct is compounded with the elastomer in an amount of about 2 to 50 percent by weight of the elastomeric material.

6. The fire retardant elastomeric compound of claim 1 wherein the Diels-Alder adduct is added to the elastomeric material in an amount of about 10 to 50 percent based on the weight of the elastomeric material.

7. A fire retardant elastomeric composition comprising (a) an elastomeric material, (b) 2 to 30 percent based on the weight of the elastomeric material of a compound selected from the group consisting of arsenic compounds, antimony compounds and bismuth compounds, and (c) about 2 to about 50 weight percent, based on the elastomeric material, of the Diels-Alder adduct of safflower oil and a polyhalogenated cyclopentadiene having the formula:

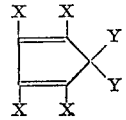

wherein X is selected from the group consisting of fluorine, chlorine and bromine, and Y is selected from the group consisting of fluorine, chlorine, bromine and an alkoxy radical of 1 to 10 carbon atoms, said Diels-Alder adduct containing at least about 10 to 50 weight percent halogen.

8. The fire retardant elastomeric composition of claim 7 wherein antimony trioxide is the added antimony compound.

9. The fire retardant elastomeric composition of claim 7 wherein lead arsenate is the added arsenic compound.

10. The fire retardant elastomeric composition of claim 7 wherein antimony trisulfide is the added antimony compound.

11. The fire retardant elastomeric composition of claim 7 wherein the elastomeric material is styrene-butadiene rubber.

12. The fire retardant elastomeric composition of claim 7 wherein the elastomeric material is butyl rubber.

13. The fire retardant elastomeric composition of claim 7 wherein the elastomeric material is an ethylene-propylene terpolymer.

14. The fire retardant elastomeric composition of claim 7 wherein the elastomeric material is ethylene-propylene rubber.

15. A fire retardant elastomeric composition comprising (a) an elastomeric material, (b) 2 to 30 percent antimony trioxide based on the weight of the elastomeric material, and (c) about 2 to 50 weight percent based on the elastomeric material of the Diels-Alder adduct of safflower oil and hexachlorocyclopentadiene wherein said hexachlorocyclopentadiene is reacted with said safflower oil in a proportion of 0.1 to 1.1 equivalent of hexachlorocyclopentadiene per equivalent of safflower oil.

16. A fire retardant elastomeric composition comprising styrene-butadiene rubber, 2 to about 30 weight percent of antimony trioxide, 10 to 50 weight percent of the Deils-Alder adduct of safflower oil and hexachlorocyclopentadiene wherein said hexachlorocyclopentadiene is reacted with said safflower oil in a proportion of about 0.1 to 1.1 equivalent of hexachlorocyclopentadiene per equivalent of safflower oil, said weight percents being based on the weight of said styrene-butadiene rubber.

17. The vulcanized fire retardant elastomeric composition of claim 1.
18. The vulcanized fire retardant elastomeric composition of claim 7.
19. The vulcanized fire retardant elastomeric composition of claim 15.
20. The vulcanized fire retardant elastomeric composition of claim 16.

References Cited

UNITED STATES PATENTS

| | | | |
|---|---|---|---|
| 2,669,521 | 2/1954 | Bierly | 106—15 |
| 2,721,185 | 10/1955 | Schulze et al. | 260—5 |
| 2,863,848 | 12/1958 | Robitschek et al. | 260—23.7 |
| 3,025,262 | 3/1962 | Peters et al. | 260—45.75 |
| 3,031,425 | 4/1962 | Schoepfle et al. | 260—28.5 |
| 3,251,790 | 5/1966 | Christenson et al. | 260—18 |

OTHER REFERENCES

Chatfield, "Varnish Constituents," 1953, p. 101.
Noller, "Chemistry of Organic Compounds," 1957, p. 181.

DONALD E. CZAJA, Primary Examiner.
R. A. WHITE, Assistant Examiner.

U.S. Cl. X.R.

260—18, 23, 23.5, 37, 41, 41.5, 45.7, 45.75

UNITED STATES PATENT OFFICE
CERTIFICATE OF CORRECTION

Patent No. 3,449,279           Dated June 10, 1969

Inventor(s)    Raymond R. Hindersinn et al.

It is certified that error appears in the above-identified patent and that said Letters Patent are hereby corrected as shown below:

Column 2, line 18 after "bromine" read---and Y is selected from the group consisting of fluorine, chlorine, bromine---. Column 4, line 2, delete "tris ($\beta$-chlorobutyl) antimonite"; column 4, line 39, for "compounds" read---compounded---; column 4, line 52, for the numbers in the table "1.2   1   2   1" read---1.2   1.2   1.2---. Column 5, line 72, for "minute" read---minutes---. Column 6, line 47, delete "(1)" and insert---burning---. Column 7, line 6, for "Hardnes" read---Hardness---. Column 8, line 70, for "Deils" read---Diels---.

SIGNED AND SEALED

JUN 9 1970

(SEAL)
Attest:

Edward M. Fletcher, Jr.
Attesting Officer

WILLIAM E. SCHUYLER, JR.
Commissioner of Patents